Patented Feb. 2, 1932

1,843,127

UNITED STATES PATENT OFFICE

CHARLES W. GIRVIN, OF LONG BEACH, CALIFORNIA, ASSIGNOR OF FORTY PER CENT TO LEVERING LAWRASON, OF LOS ANGELES, CALIFORNIA

PROCESS FOR RECOVERING IODINE

No Drawing. Application filed December 9, 1929. Serial No. 412,925.

This invention relates to the recovery of iodine from solutions containing relatively small quantities of soluble iodides and appreciably greater quantities of soluble chlorides, and is applicable to treatment of natural brines, oil field waste water and the like which contain small quantities of iodine in the form of iodides, or to treatment of solutions such as the mother liquor remaining after the recovery of nitrates from natural deposits and which contain small quantities of iodine in the form of iodates which are adapted for ready conversion to iodides by the use of a suitable reducing agent.

In my co-pending application Ser. No. 408,423, filed November 19, 1929, I have described and claimed the process of treating such brines with silver chloride so as to convert the soluble iodides to practically insoluble silver iodide which is readily recoverable by simple filtration, and the present invention is an improvement upon my copending application and relates to the formation of the silver chloride which is employed to convert the soluble iodides to practically insoluble silver iodide.

It is an object of the invention to form the silver chloride economically and in a manner whereby it is directly available for reaction with the soluble iodides in the brine, and to form the silver chloride from the natural chlorides of the brine, preferably by a process providing the necessary agitation for thoroughly mixing the silver chloride with the scattered molecules of insoluble iodides.

More particularly it is an object of the invention to form the silver chloride by electrolyzing the brine from which the soluble iodides are to be recovered, with the anode plate formed of silver so that the chlorides of the brine form silver chloride, which since it does not adhere firmly to the anode plate may be readily diffused through the brine, simply by agitation or by first scraping it from the anode plate and then agitating the brine, so as to penetrate to each of the scattered molecules of soluble iodides for converting them to insoluble silver iodide.

The brine which is to be treated, containing small quantities of soluble iodides and appreciably greater quantities of soluble chlorides, is collected in a suitable container and subjected to electrolysis with the anode formed of silver and the electric voltage, with no necessity for accurate regulation, being such as to decompose the brine so that ions of both iodine and chlorine migrate to the silver anode, and deposit thereon as silver chloride and practically insoluble silver iodide, although since the iodides are present in the brine in extremely small quantities as compared with the chlorides, only a small proportion of the iodides will immediately form insoluble silver iodide, while relatively large quantities of silver chloride will be formed, and this silver chloride, which while difficultly soluble is by mechanical agitation adapted to penetrate to all of the remotely scattered remaining molecules of insoluble iodides so as to convert them to insoluble silver iodide.

The necessary mechanical agitation for releasing the slightly adhering silver salts from the anode plate, and for then thoroughly mixing the silver chloride with the entire volume of the brine so as to penetrate to each of the remaining scattered molecules of soluble iodides, may be obtained by supplying the brine to the container through a suitable nozzle arranged for impingement of the jet of brine against the anode plate of the electrolytic apparatus, thereby washing away the silver salts as fast as they deposit on the anode plate and thus precipitating the insoluble silver iodide and agitating the entire volume of brine by the swiftly flowing current which is induced by the jet, so that the slightly soluble silver chloride is thoroughly mixed in the brine. For simplification of apparatus, the nozzle from which the jet of brine is discharged may be of a suitable metal, iron for example, and may form the cathode of the electrolytic apparatus.

However it will be apparent that the process is not limited to apparatus such as described, but may be employed in connection with any suitable electrolytic apparatus, with the silver salts which deposit on the anode plate adapted for mechanical removal in any suitable manner which may comprise a scraping action or the like rather than mere agitation; and it will be further apparent that the silver chloride may be diffused throughout the entire volume of brine by any suitable agitating means.

The silver chloride having converted all of the scattered molecules of soluble iodides to insoluble silver iodide, the latter is readily precipitated in the brine and may be recovered by simple filtration and then removed from the filtering medium and decomposed in any well known manner for separating the silver and iodine. In my aforementioned copending application I have proposed removal of the silver iodide from the filtering medium by dissolving it in a cyanide solution, although any other suitable method such as mechanical scraping or reverse flushing action may be employed. In the present process wherein the silver chloride is formed by electrolytic action, it may be advantageous to remove the silver iodide from the filtering medium by a cyanide solution, and to then subject the cyanide solution to electrolytic action for separating the silver and the iodine, with the silver ions depositing on the cathode which may be a plate of iron or the like, adapted when thus silver-plated for use as the silver anode in the initial step of electrolyzing the brine to form the silver chloride, and the iodine ions forming a cyanide solution from which the iodine may be recovered in any suitable manner.

I have thus provided an extremely simple and practical electrolytical method of forming silver chloride in a natural brine containing small quantities of soluble iodides and relatively greater quantities of chlorides, with the silver chloride which is deposited on the anode adapted for mechanical removal for penetrating to and converting the scattered molecules of soluble iodides to insoluble silver iodide which is then readily recovered by simple filtration.

I claim:

1. The method of recovering iodine from a solution containing soluble iodides and chlorides, which comprises electrolyzing the solution, the anode being silver so as to deposit silver chloride, and the solution being supplied as a jet impinging against the silver anode for washing off the silver chloride deposits and diffusing the same in the solution so as to convert the soluble iodides to substantially insoluble silver iodide.

2. The method of recovering iodine from a solution containing soluble iodides, which comprises electrolyzing the solution, the anode being a metal and the solution containing a soluble salt whereby a metallic salt is deposited which is adapted to convert the soluble iodides to an iodide of the metal which is substantially insoluble in the solution, and the solution being supplied as a jet impinging against the anode for washing off the deposits of the metallic salt and diffusing the same in the solution.

3. The method of recovering iodine from a solution containing soluble iodides and chlorides, which comprises electrolyzing the solution, the anode being silver so as to deposit silver chloride, diffusing the silver chloride in the solution so as to convert the soluble iodides to substantially insoluble silver iodide, separating the silver iodide, dissolving the silver iodide in a cyanide solution, and electrolyzing the cyanide solution so as to deposit the silver on the cathode and thereby form a silver plate adapted for use as the aforementioned silver anode.

4. The method of recovering iodine from a solution containing soluble iodides, which comprises electrolyzing the solution, the anode being a metal and the solution containing a soluble salt whereby a metallic salt is deposited which is adapted to convert the soluble iodides to an iodide of the metal which is substantially insoluble in the solution, separating the metallic iodide, dissolving the metallic iodide in a cyanide solution, and electrolyzing the cyanide solution so as to deposit the metal on the cathode and thereby form a plating of the metal adapted for use as the aforementioned metallic anode.

5. The method of recovering iodine from natural brines containing extremely small quantities of soluble iodides, which comprises electrolyzing the brine, the anode being silver so as to deposit silver chloride, and mechanically removing the silver chloride from the anode and diffusing the silver chloride in the brine so as to convert the soluble iodides to substantially insoluble and readily precipitated silver iodide.

6. The method of recovering iodine from natural brines containing extremely small quantities of soluble iodides, which comprises electrolyzing the brine using a potential difference adapted to free chloride and iodide anions, the anode being silver so as to deposit silver halides, and mechanically removing the silver halides from the anode and diffusing the silver halides in the brine so that the silver chloride converts the remaining soluble iodides to substantially insoluble and readily precipitated silver iodide.

7. The method of recovering iodine from a solution containing soluble iodides, which comprises electrolyzing the solution, the anode being a metal and the solution containing a soluble salt whereby a metallic salt is deposited which is adapted to convert the soluble iodides to an iodide of the metal which is substantially insoluble in the solution, and mechanically removing the metallic salt from the anode and diffusing the metallic salt in the solution so as to convert all of the soluble iodides to said insoluble iodide of the metal.

8. The method of recovering iodine from a solution containing soluble iodides, which comprises electrolyzing the solution, the anode being a metal and the solution containing a soluble salt whereby a metallic salt is deposited which is somewhat soluble in the solution and is adapted to convert the soluble iodides to an iodide of the metal which is substantially insoluble and adapted to precipitate in the solution, separating the precipitated iodide of the metal, and electrolyzing a solution of the said iodide of the metal so as to deposit ions of the metal on the cathode.

9. The method of recovering iodine from a solution containing soluble iodides and chlorides, which comprises electrolyzing the solution, the anode being silver so as to deposit silver chloride, diffusing the silver chloride in the solution so as to convert the soluble iodides to substantially insoluble and readily precipitated silver iodide, separating the precipitated silver iodide, and electrolyzing a solution of the silver iodide so as to deposit the silver ions on the cathode.

10. The method of recovering iodine from a solution containing soluble iodides, which comprises electrolyzing the solution, the anode being a metal and the solution containing a soluble salt whereby a metallic salt is deposited which is somewhat soluble in the solution and is adapted to convert the soluble iodides to an iodide of the metal which is substantially insoluble and adapted to precipitate in the solution, separating the precipitated iodide of the metal, and electrolyzing a solution of the said iodide of the metal so as to deposit ions of the metal on the cathode and thereby form a plating of the metal adapted for use as the aforementioned metallic anode.

11. The method of recovering iodine from a solution containing soluble iodides and chlorides, which comprises electrolyzing the solution, the anode being silver so as to deposit silver chloride, diffusing the silver chloride in the solution so as to convert the soluble iodides to substantially insoluble and readily precipitated silver iodide, separating the precipitated silver iodide, and electrolyzing a solution of the silver iodide so as to deposit the silver ions on the cathode and thereby form a silver plate adapted for use as the aforementioned silver anode.

In testimony whereof I have affixed my signature.

CHARLES W. GIRVIN.